(12) United States Patent
Wang

(10) Patent No.: US 8,326,382 B2
(45) Date of Patent: Dec. 4, 2012

(54) SLIDER ELECTRONIC DEVICE

(75) Inventor: Wei-Jun Wang, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 313 days.

(21) Appl. No.: 12/899,718

(22) Filed: Oct. 7, 2010

(65) Prior Publication Data

US 2011/0151948 A1 Jun. 23, 2011

(30) Foreign Application Priority Data

Dec. 23, 2009 (CN) .......................... 2009 1 0312086

(51) Int. Cl.
*H04M 1/10* (2006.01)
*H04M 9/00* (2006.01)
*H05K 7/16* (2006.01)
(52) U.S. Cl. ................. 455/575.4; 379/433.12; 361/727
(58) Field of Classification Search ............... 455/550.1, 455/575.1, 575.4; 379/433.01, 433.11, 433.12; 361/724, 725, 727
See application file for complete search history.

(56) References Cited

U.S. PATENT DOCUMENTS

| 7,778,663 B2 * | 8/2010 | Bong Doo | 455/556.1 |
| 2010/0035670 A1 * | 2/2010 | Mine | 455/575.4 |

* cited by examiner

*Primary Examiner* — Nguyen Vo

(74) *Attorney, Agent, or Firm* — Altis Law Group, Inc.

(57) ABSTRACT

A slider electronic device includes a first body, a second body, and a connecting member fixed to the first body. The first body includes at least one control member rotatably disposed on the first body and at least two first sliding members. The second body is slidably coupled with the first body. The second body includes at least one restricting member and at least two second sliding members. The connecting member defines at least two guide portions corresponding to the at least two first sliding members. The at least one control member is capable of blocking the at least one restricting member of the second body. Each first sliding member includes a sliding surface angled relative to the axis along which the second body slides. Each second sliding member passes through the corresponding guide portion to slide along the sliding surface, and be elastically deformed.

16 Claims, 8 Drawing Sheets

SLIDER ELECTRONIC DEVICE

BACKGROUND

1. Technical Field

The present disclosure relates to electronic devices, and particularly, to a slider electronic device.

2. Description of Related Art

Currently, slider electronic devices, such as mobile phones, are becoming increasingly popular. A slider electronic device is generally configured with a first body, a second body and a slide mechanism connecting the first and the second bodies. A keypad is configured in the first body, and a display is configured in the second body. The second body slides over the first body via the slide mechanism, thereby opening or closing the slider electronic device.

A typical slide mechanism includes a main plate, a slide plate and two springs. The main plate is fixed to the first body and the slide plate is fixed to the second body of the slider electronic device. Opposite ends of each spring are fastened to the main plate and the slide plate respectively.

However, the structure of the conventional slider electronic device is unduly complex and complicated to assemble.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the views.

DETAILED DESCRIPTION

Figure 1:
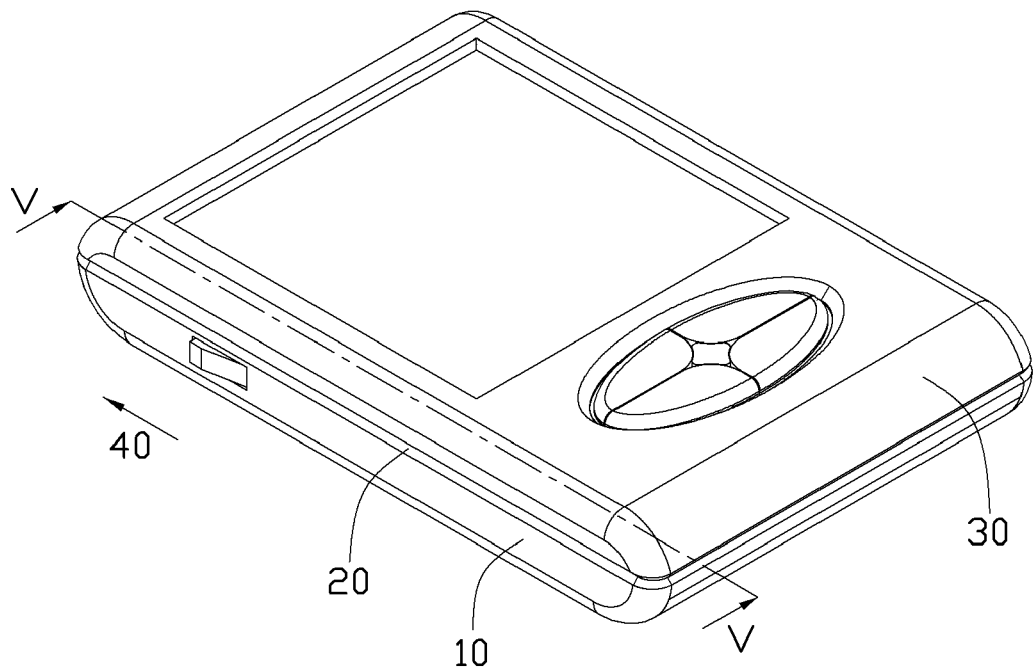
FIG. 1 is an assembled, isometric view of one embodiment of a slider electronic device including a first body and a second body.
Figure 2:
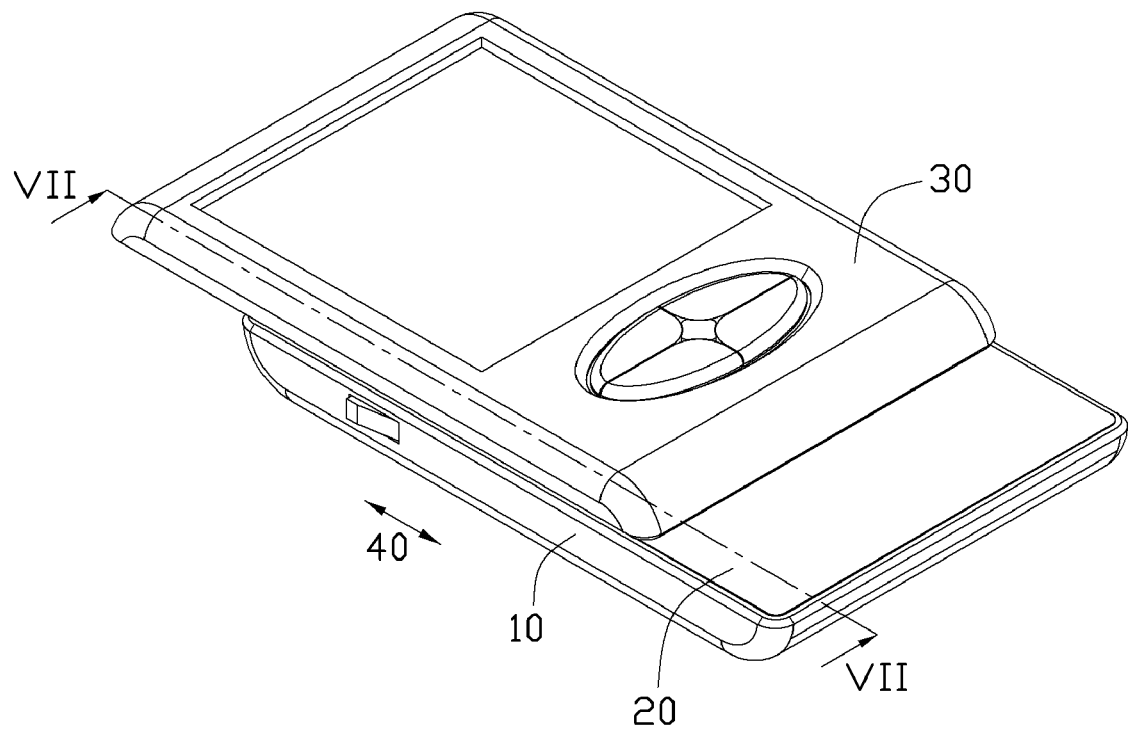
FIG. 2 is similar to FIG. 1, but shows the electronic device open.

Referring to FIG. 1 and FIG. 2, an embodiment of a slider electronic device 100 includes a first body 10, a connecting member 20, and a second body 30. The first body 10 is slidably coupled with the second body 30, and capable of sliding along an axis 40 relative to the second body 30.

Figure 3:
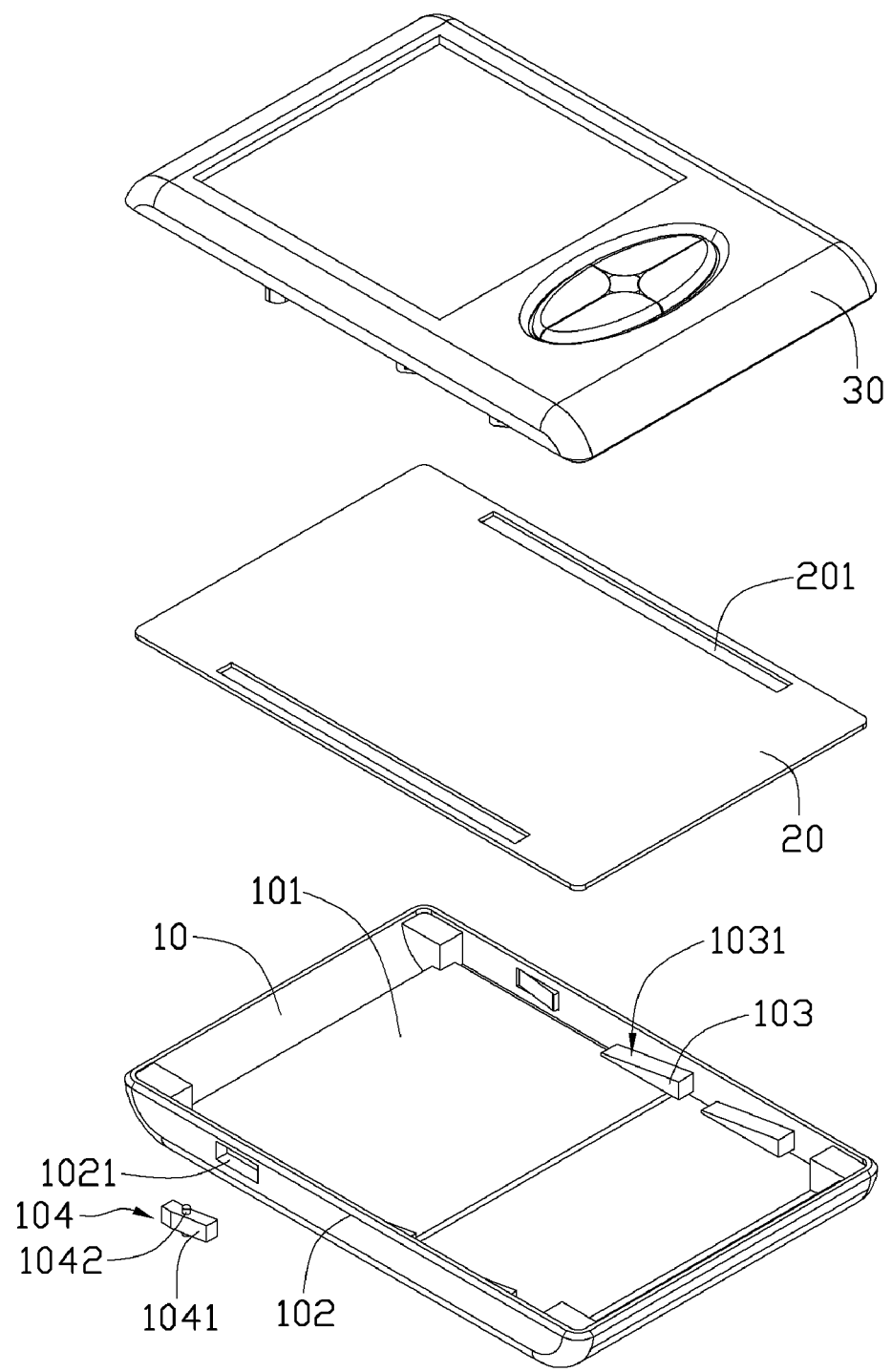
FIG. 3 is an exploded, isometric view of the slider electronic device of FIG. 1.
Figure 4:
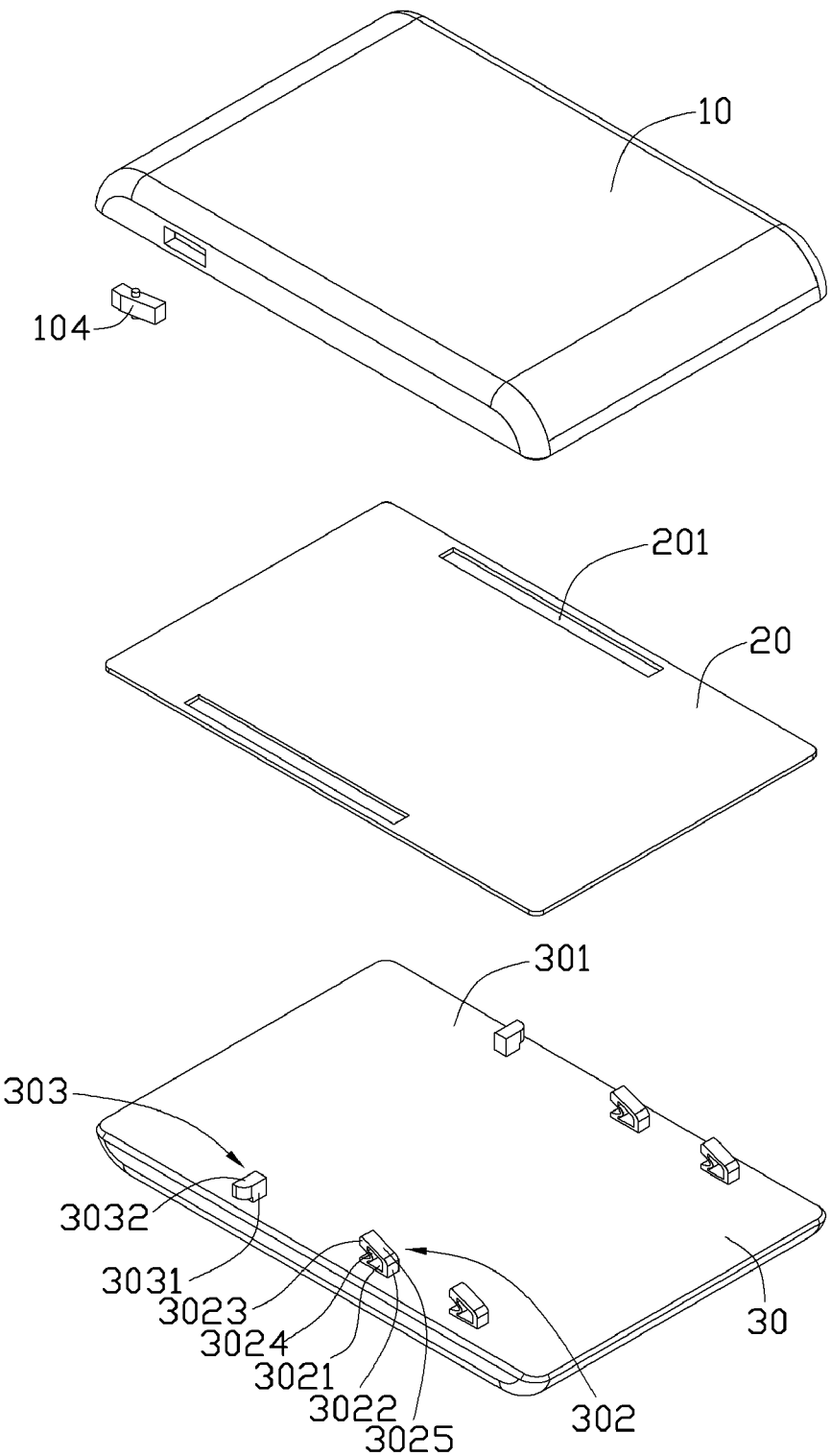
FIG. 4 is similar to FIG. 2, but viewed from another aspect.

Referring to FIG. 3 and FIG. 4, the first body 10 is molded, and includes a bottom surface 101, two opposite sidewalls 102 extending from two opposite edges of the bottom surface 101, four first sliding members 103, and a pair of control members 104.

Each sidewall 102 is substantially perpendicular to the bottom surface 101. Each sidewall 102 defines a receiving hole 1021. In the illustrated embodiment, the receiving hole 1021 is a rectangular through hole.

Each first sliding member 103 is substantially a wedge-shaped block, and includes a sliding surface 1031 at a top thereof. Each first sliding member 103 is positioned on the bottom surface 101, and the sliding surface 1031 forms an angle relative to the axis 40. In the illustrated embodiment, the four first sliding members 103 are divided into two pairs, where each first sliding member 103 is located near to a sidewall 102. Angles defined by the sliding surfaces 1031 relative to the axis 40 are the same.

Each control member 104 is activated by pressing. Each control member 104 includes a contact portion 1041 and two pivot shafts 1042 extending from opposite sides of the contact portion 1041. Each pivot shaft 1042 is made of an elastic material such as polycarbonate, or ABS. Each control member 104 is received in a corresponding receiving hole 1021 and connected to the sidewall 102 via the two pivot shafts 1042. An end of each control member 104 adjacent to the first sliding member 103 protrudes from an inner surface of the sidewall 102.

Each connecting member 20 is a rectangular plate, and defines two guide portions 201, in which each guide portion 201 corresponding to each pair of first sliding members 103. In the illustrated embodiment, each of the guide portions 201 is a guide slot defined in the connecting member 20 extending along the axis 40. The two guide portions 201 are spaced apart.

The second body 30 includes a fixing board 301, four second sliding members 302, and two restricting members 303. Each second sliding member 302 is positioned on the fixing board 301 corresponding to each first sliding member 103. The four second sliding members 302 are molded integral with the fixing board 301.

Each second sliding member 302 includes a fixing portion 3021 fixed to the fixing board 301, a connecting portion 3022, a resisting portion 3023, and a reinforcing portion 3024. The connecting portion 3022 is angled from an end of the fixing portion 3021. The resisting portion 3023 is angled from an end of the connecting portion 3022 away from the fixing portion 3021. The fixing portion 3021 and the resisting portion 3023 are on the same side of the connecting portion 3022. The resisting portion 3023 includes a resisting surface 3025 angled relative to the fixing board 301 by an angle exceeding that which is cooperatively defined by the sliding surface 1031 and the axis 40. The reinforcing portion 3024 is substantially V-shaped, and interconnects the fixing portion 3021 and the resisting portion 3023.

Each restricting member 303 includes a latching portion 3031 and a restricting portion 3032. The restricting portion 3032 extends from an end of the latching portion 3031. Width of the latching portion 3031 is less than that of the guide portion 201, and the width of the restricting portion 3032 is greater than that of the guide portion 201, such that the latching portion 3031 can pass through the corresponding guide portion 201, and the restricting portion 3032 cannot pass through and is blocked by the guide portion 201.

Figure 5:
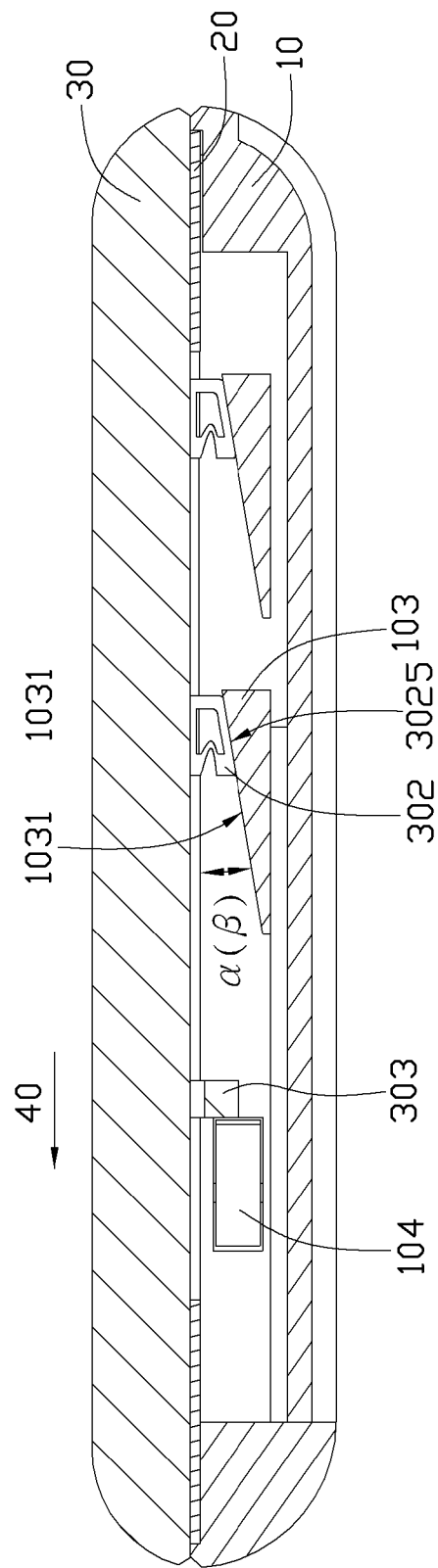
FIG. 5 is a cross section of the slider electronic device taken along line V-V in FIG. 1.
Figure 6:
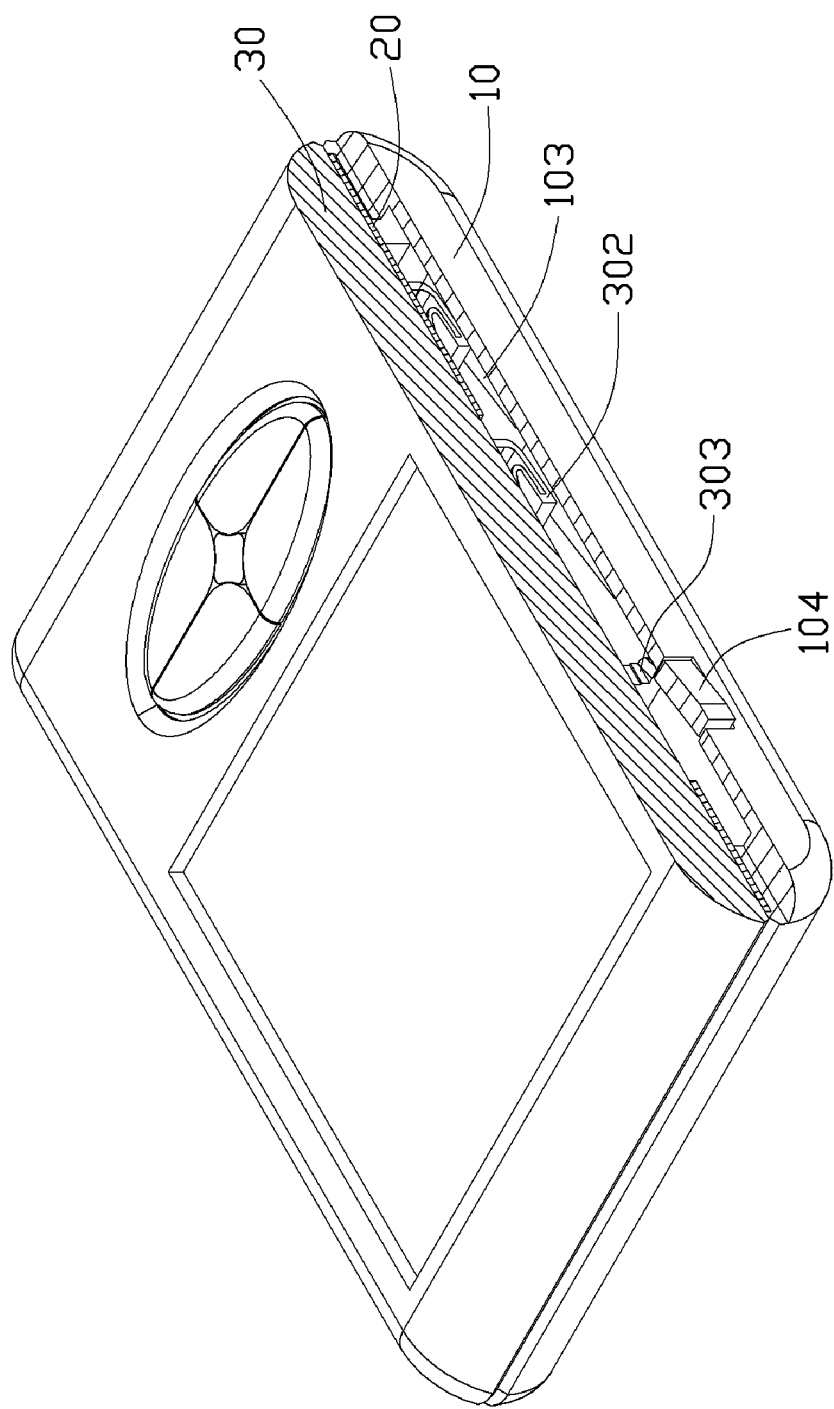
FIG. 6 is an isometric cutaway view of the slider electronic device taken along line V-V in FIG. 1

Referring to FIG. 5 and FIG. 6, in assembly of the slider electronic device 100, each restricting member 303 is at a predetermined position on the first body 10, and the restricting portion 3032 abuts the bottom surface 101 and an end of the restricting portion 3032 abuts the end of the control member 104 protruding from the sidewall 102. The connecting member 20 is fixed to the first body 10; and each latching portion 3031 passes through the corresponding guide portion 201. The second body 30 is mounted on the connecting member 20, and each second sliding member 302 passes through the corresponding guide portion 201 and is received in the first body 10. Pressure applied on the second body 30 deforms the second sliding member 302, such that the resisting surface 3025 of the second sliding member 302 abuts the corresponding sliding surface 1031 of the first sliding member 103, and an angle β cooperatively defined by the resisting surface 3025 and the axis 40 is equal to an angle α cooperatively defined by the sliding surface 1031 and the axis 40. Then, an end of the latching portion 3031 away from the restricting portion 3032 is fixed to the fixing board 301.

When the first body 10 is closed relative to the second body 30, the restricting member 303 is blocked by the control member 104, which further prevents the second sliding member 302 from moving along the sliding surface 1031. The second sliding member 302 is compressed and the resisting surface 3025 resists the sliding surface 1031, thus elastic potential energy is generated.

Figure 7:
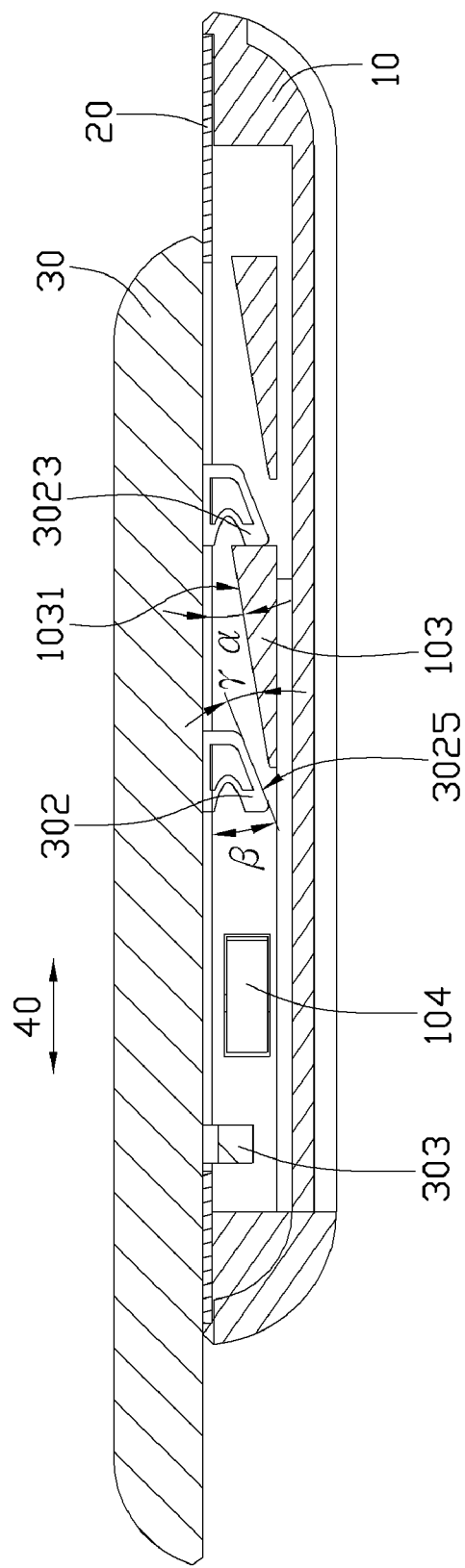
FIG. 7 is a cross section of the slider electronic device taken along line VII-VII in FIG. 2.

Referring to FIG. 6 and FIG. 7, in order to open the first body 10 relative to the second body 30, external force exerted or applied on one end of the control member 104 away from the first sliding member 103 rotates the control member 104 around the pivot shafts 1042 out of a receiving space cooperatively formed by the bottom surface 101 and the sidewall 102. Concurrently, the second sliding member 302 is released and is driven along the sliding surface 1031 by the elastic force of the second sliding member 302, to a predetermined position. The second sliding member 302 returns to its original shape; an angle γ is cooperatively defined by the sliding surface 1031 and the resisting surface 3025 and the angle α equals the angle β.

Figure 8:
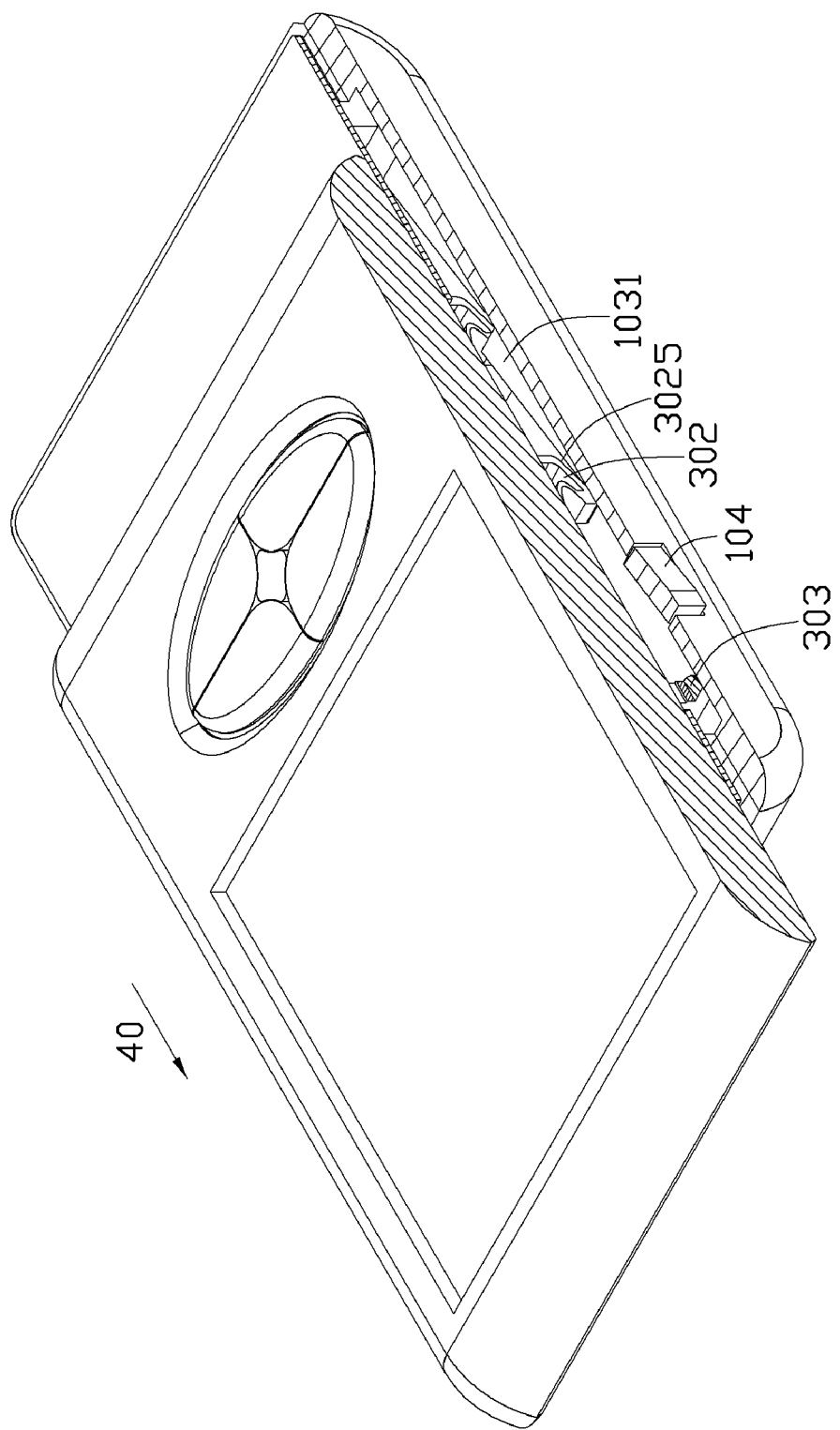
FIG. 8 is an isometric cutaway view of the slider electronic device taken along line VII-VII in FIG. 2.

Referring to FIG. 7 and FIG. 8, in order to close the first body 10 relative to the second body 30, an external force applied on the second body 30 along the axis 40 slides the second sliding member 302 along the guide portion 201. At the same time, the resisting portion 3023 of the second sliding member 302 resists the sliding surface 1031 and slides along the sliding surface 1031. When the second sliding member 302 slides, the resisting portion 3023 is deformed, such that the angle β decreases, and a distance between the fixing portion 3021 of the second sliding member 302 and the sliding surface 1031 decreases as well. While continuing to slide, the restricting member 303 biases the control member 104, and the control member 104 which rotates around the pivot shafts 1042, is twisted and deformed accordingly. When the restricting member 303 slides away from the control member 104, the resisting surface 3025 contacts the sliding surface 1031, the control member 104 rotates around the pivot shafts 1042 in an opposite direction to block the restricting member 303. The second sliding member 302 is gradually compressed and an elastic potential energy is generated while impelling the restricting member 303 to resist the control member 104.

In the slider electronic device 100, when the control member 104 blocks the restricting member 303, the second body 30 is securely closed relative to the first body 10. When pressure exerted or applied on the control member 104 releases the restricting member 303, the second body 30 slides to the predetermined position relative to the first body 10 when driven by the elastic potential energy of the second sliding member 302, such that no pressure need to be applied on the second body 30 to open the second body 30 relative to the first body 10.

The slider electronic device 100 can be opened or closed by controlling the relative sliding of the first sliding member 103 or the second sliding member 302. The structure of the slider electronic device 100 is relatively simple, thereby can be easily assembled. The first body 10 is molded, such that the slider electronic device 100 may be more easily manufactured at minimal cost.

It should be pointed out that two or more first sliding members 103, rather than four can be provided, such as, for example, having a total of two first sliding members 103, and each first sliding member 103 can be fixed to the opposite sidewalls 102 respectively, whereby the number of the second sliding member 302 is changed correspondingly. The slider electronic device 100 may employ one control member 104 and one restricting member 303.

The fixing portion 3021, the connecting portion 3022, and the reinforcing portion 3024 may be omitted, whereby the resisting portion 3023 is fixed to the fixing board 301 directly.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A slider electronic device, comprising:
a first body comprising at least one control member and at least two first sliding members, the at least one control member rotatably disposed on the first body;
a second body slidably coupled with the first body, the second body comprising at least one restricting member and at least two second sliding members corresponding to the at least two first sliding members; and
a connecting member fixed to the first body, wherein the connecting member defines at least two guide portions corresponding to the at least two first sliding members and the at least one control member is capable of blocking the at least one restricting member of the second body, each first sliding member comprises a sliding surface at a top thereof, angled relative to the axis along which the second body slides, wherein each second sliding member passes through the corresponding guide portion to slide along the sliding surface and be elastically deformed.

2. The slider electronic device of claim 1, wherein each second sliding member comprises a resisting portion capable of elastic deformation, the resisting portion comprises a resisting surface angled relative to the axis, an angle cooperatively defined by the resisting surface and the axis exceeding that cooperatively defined by the sliding surface and the axis, wherein an angle cooperatively defined by the sliding surface and the resisting surface plus the angle cooperatively defined by the sliding surface and the axis equals the angle cooperatively defined by the resisting surface and the axis.

3. The slider electronic device of claim 2, wherein each second sliding member further comprises a fixing portion connected to the second body and a connecting portion, the connecting portion angled from an end of the fixing portion and the resisting portion extending from an end of the connecting portion away from the fixing portion, wherein the fixing portion and the resisting portion are on the same side of the connecting portion.

4. The slider electronic device of claim 3, wherein each second sliding member further comprises a reinforcing portion interconnecting the fixing portion and the resisting portion.

5. The slider electronic device of claim 1, wherein each guide portion is a guide slot defined in the connecting member and extending along the axis.

6. The slider electronic device of claim 1, wherein the first body defines at least one receiving hole corresponding to the at least one control member, each control member comprising a contact portion and two pivot shafts extending from two opposite sides of the contact portion, and each control member received in the corresponding receiving hole and the two pivot shafts are rotatably fixed to the first body.

7. The slider electronic device of claim 6, wherein each pivot shaft is elastic material.

8. The slider electronic device of claim 1, wherein each restricting member comprises a latching portion passing through the guide portion and a restricting portion blocked by the guide portion.

9. A slider electronic device, comprising:
a first body comprising at least one control member and at least two first sliding members, the at least one control member rotatably disposed on the first body;
a second body slidably coupled with the first body, the second body comprising at least one restricting member and at least two second sliding members corresponding to the at least two first sliding members; and
a connecting member fixed to the first body, and defining at least two guide portions therethrough, through which the at least one restricting member passes, the at least one control member capable of blocking the at least one restricting member of the second body, and each second sliding member applying elastic force on the second body, and when each control member blocks the corresponding restricting member, each second sliding member is thereby deformed; and when each control member releases the corresponding restricting member, the elastic force of the second sliding member drives the second body to slide relative to the first body.

10. The slider electronic device of claim 9, wherein each first sliding member comprises a sliding surface at a top thereof angled relative to the axis along which the second body slides, and each second sliding member passes through the corresponding guide portion to slide along the sliding surface and be elastically deformed.

11. The slider electronic device of claim 10, wherein each second sliding member further comprises a fixing portion connected to the second body and a connecting portion angled from an end of the fixing portion, the resisting portion extending from an end of the connecting portion away from the fixing portion, and the fixing portion and the resisting portion are on the same side of the connecting portion.

12. The slider electronic device of claim 11, wherein each second sliding member further comprises a reinforcing portion interconnecting the fixing portion and the resisting portion.

13. The slider electronic device of claim 9, wherein each restricting member comprises a latching portion passing through the guide portion and a restricting portion blocked by the guide portion.

14. The slider electronic device of claim 9, wherein each guide portion is a guide slot defined in the connecting member and extending along the axis.

15. The slider electronic device of claim 9, wherein the first body defines at least one receiving hole corresponding to the at least one control member, each control member comprises a contact portion and two pivot shafts extending from two opposite sides of the contact portion and received in the corresponding receiving hole, and the two pivot shafts are rotatably fixed to the first body.

16. The slider electronic device of claim 15, wherein each pivot shaft is elastic material.

* * * * *